United States Patent [19]

Persson et al.

[11] Patent Number: 4,620,308

[45] Date of Patent: Oct. 28, 1986

[54] ARC FURNACE ELECTRODE CONTROL

[75] Inventors: John A. Persson, Gibsonia; Ross E. Andrews, Bethel Park; Michael A. Maola, Pittsburgh, all of Pa.

[73] Assignee: Lectromelt Corporation, Pittsburgh, Pa.

[21] Appl. No.: 792,782

[22] Filed: Oct. 30, 1985

[51] Int. Cl.[4] .............................................. H05B 7/148

[52] U.S. Cl. ..................................................... 373/105

[58] Field of Search ................ 373/102, 104, 105, 106

[56] References Cited

U.S. PATENT DOCUMENTS 1,573,095 2/1926 Saklatwalla et al. .
1,915,095 6/1933 Jump .
2,419,988 5/1947 Davis .
2,480,463 8/1949 Grangette .
3,209,060 9/1965 Borrebach .
3,435,121 3/1969 Jackson .
3,660,583 5/1972 Takanasi et al. .
3,662,075 5/1972 Sakai et al. .
4,029,888 6/1977 Roberts et al. .
4,096,344 6/1978 Munson .
4,349,912 9/1982 Bello .................................. 373/105

*Primary Examiner*—Roy N. Envall, Jr.
*Attorney, Agent, or Firm*—Fred Wiviott

[57] ABSTRACT

An arc furnace electrode control includes phase angle measuring devices connected respectively for producing a phase angle signal functionally related to the phase angle between the primary electrode voltage and current. A bias circuit is coupled to the primary of each phase for producing a bias signal functionally related to the reactive volt amperes delivered to the electrodes. Null detectors are coupled to each phase angle measuring device for receiving one of the phase angle signals and to the bias circuit for receiving the bias signal for producing a control signal for each phase related to the difference between the respective phase angle signal and the bias signal. A control is coupled to each null detector and is responsive to each control signal for individually positioning the respective electrodes in relation to the furnace so as to achieve preselected phase angles.

10 Claims, 1 Drawing Figure

ARC FURNACE ELECTRODE CONTROL

BACKGROUND OF THE INVENTION

This invention relates to electric arc furnaces and more particularly to controls for positioning the electrodes of electric arc furnaces.

Electric arc furnaces are commonly employed for melting or treating metallic furnace charges. The heat required for such fusion or treatment is provided by the arcs maintained between the electrodes and the contents of the furnace. It will be appreciated that the position of the electrodes relative to the furnace charge affects the voltage and current parameters. As a result, arc furnace electrodes must be positioned vertically at proper elevations relative to the furnace charge in order to maintain furnace electrical conditions within desired limits.

One prior art method of controlling the position of arc furnace electrodes was to employ impedances for generating voltage signals functionally related to arc current and voltage. However, the impedance method of electrode control does not provide proper management of the power supplied to the furnace during operations such as, for example, scrap melting and smelting. One problem is that most measurements of secondary electrode current are inaccurate owing to uneven distribution of current in the secondary conductors and to the fact that only a portion of the current is usually sampled and the final value is the result of arbitrary proportioning. Further, inaccuracies are introduced because the currents in the three phase electrodes are interrelated so that a change in value in one electrode affects the current levels in the other two. Additionally, current and/or voltage signal levels change with changes in transformer tap settings, making it necessary to accommodate different levels of signal strength. Furthermore, the signals are generally rectified which eliminates the phase displacement between voltage and current that is necessary in order to obtain true impedance values. The secondary voltage and current signals also do not provide an accurate measure of the individual phase impedances because there is no common neutral since the secondary circuit within the furnace bath represents a delta load with the arcs acting as switches to transfer current from one phase to another.

SUMMARY OF THE INVENTION

It is an object of the invention to provide a new and improved control for positioning electric arc furnace electrodes.

Another object of the invention is to provide an electric arc furnace electrode positioning control wherein measurements can be made on the primary side of the furnace transformer.

A further object of the invention is to provide an electrode-positioning control for arc furnace electrodes which results in a high degree of accuracy.

These and other objects and advantages of the invention will become more apparent from the detailed description thereof taken with the accompanying drawings.

The invention takes advantage of the fact that the power developed in a three-phase arc circuit is a function of the magnitudes of the applied phase-to-ground voltages, the phase reactances and the angles between the zero values of the phase voltage and individual phase currents. With balanced voltages and equal phase reactances, the power in each phase (to neutral) can be adjusted by adjusting the phase angle since the power, W, can be expressed by the equation:

$$\text{Power} = k(V^2/X) \sin 2\theta$$

where k is a constant that ranges from 0.9118 to 1 (usually between 0.92 and 0.93 when melting scrap), V is the phase-to-ground voltage, X is the phase-to-ground reactance and $\theta$ is the angle between the zero values of the phase-to-neutral voltage and electrode phase current. It has been found that the range of angles encountered is fairly limited since current conduction would be less than 180 electrical degrees if the phase angle were less than 31 degrees. Since the power reaches a maximum at 45 degrees, there would be no point in attempting to regulate electrode movement with a phase angle above that value. A further restriction in range would take place if the maximum phase angle were to be limited to 39 degrees since an increase of only about 2% would be achieved by maintaining a 45 degree angle while the voltage-ampere demand would increase about 15%.

The use of a power factor measuring device for regulating the position of electrodes in electric arc furnaces is well known in the prior art. For example, such prior art power factor control systems are shown in U.S. Pat. Nos. 3,662,075; 3,435,131; 2,419,988; 4,029,888 and 4,096,344. Power factor is defined as the ratio of power to volt amperes (W/VA). While the power factor normally corresponds to the cosine of the system phase angle, this is not strictly true in circuits involving arcs. Fundamentally, the phase angle in an alternating current circuit is the difference in electrical degrees between the zero point of the impressed voltage and the zero point of the associated current (always lagging in arc circuits). In three-phase arc circuits, the range of applicable and effective phase angles is from 31 degrees—below which the arc is unstable owing to less than 180 degree conduction, and 45 degrees—at which angle the circuit power reaches a maximum. Actually, only a small gain in power, about 2%, is effected by going between 39° to 45° which reduces the useful range of phase angles to about 31° to 39°.

If power factor is used to define phase angle, the error produced could be 6% at the high power end of the range and about 8% at the low power end. In other words, the error introduced by using power factor to define phase angle blankets most of the operating range of effective power control in an arc furnace circuit.

In accordance with the invention, the true phase angle of each electrode is measured commencing with a current originating only in one phase of the furnace transformer. This eliminates the influence of perturbations in the other two current paths involving the two remaining windings. The result is unlike that of a conventional furnace control circuits in which a change in the current in one electrode affects the currents in the other two. In the circuit according to the invention, any perturbation in current will be countered by a readjustment of the phase angle, but only in the case of the affected electrode.

The invention comprises a method and apparatus for individually controlling the position of electrodes in a polyphase electric arc furnace wherein the electrodes are energized by a polyphase transformer having primary and secondary windings and wherein each phase of the secondary is connected to one of its corresponding pair of electrodes for providing phase voltage and current thereto. Means are provided for separately measuring the phase angle between the voltage and current in each phase of the primary, and generating electrical signals functionally related to the phase angle in each phase of the primary circuit. Means are also provided for measuring the reactive volt amperes delivered to the transformer primary windings and generating an electrical bias signal functionally related thereto. Each of said phase angle signals and the bias signal are compared separately to a preset quantity and separate control signals are generated based on each such comparison. Each of the electrodes is individually positioned in relation to the charge in the arc furnace in conformity with the magnitude and the sense of the respective control signals.

BRIEF DESCRIPTION OF THE DRAWING

The single FIGURE of the drawing schematically illustrates a control circuit in accordance with the present invention.

DETAILED DESCRIPTION OF THE PREFERRED EMBODIMENT

Figure 1:
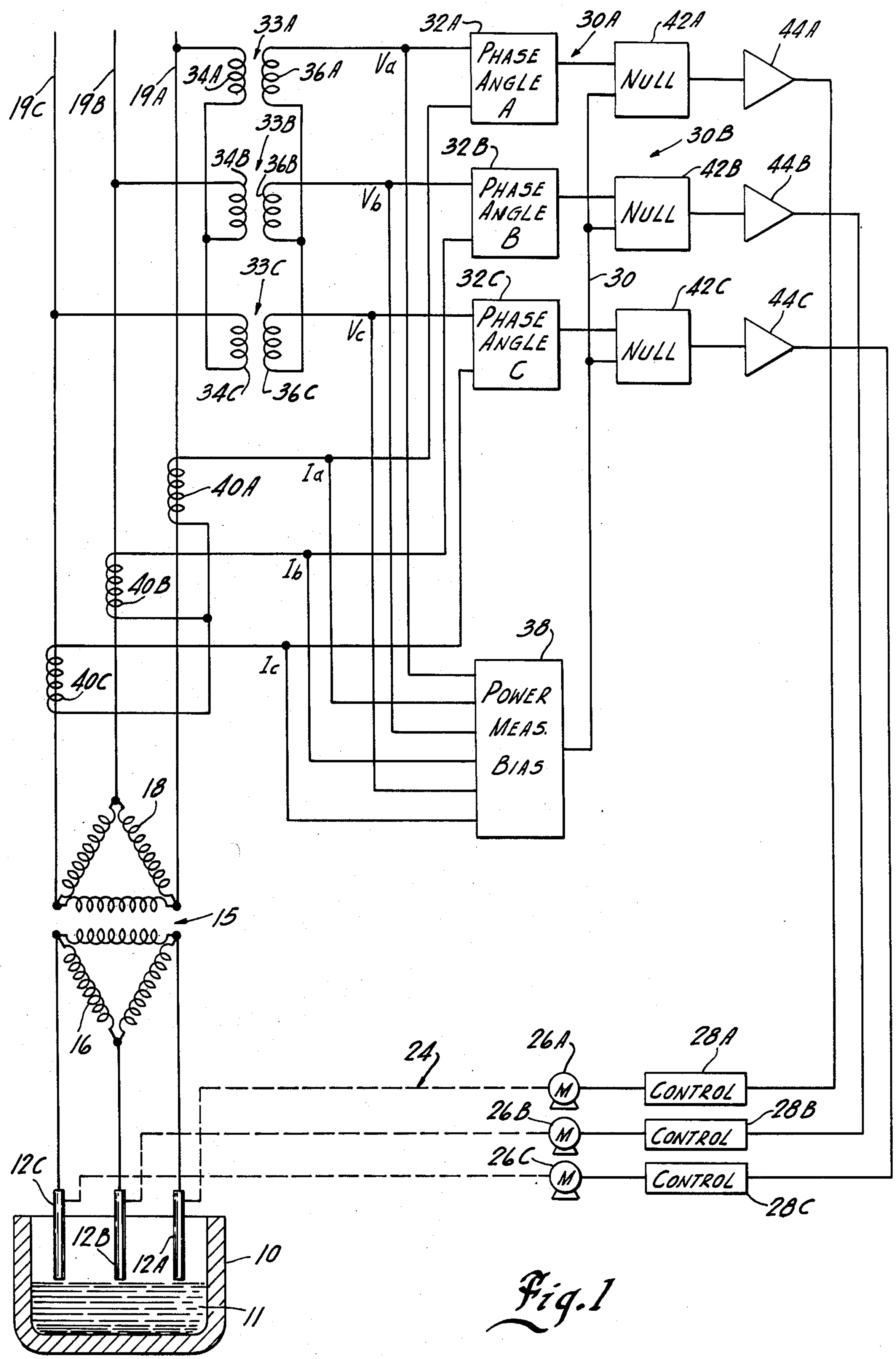

The drawing shows an electric arc furnace which includes a hearth 10 for containing a charge 11 of metal to be treated or melted, such as ferrous scrap. Three electrodes 12A, 12B and 12C are suspended above the hearth 10 by means of a schematically illustrated electrode positioning mechanism 24.

The electrodes 12A, 12B and 12C are energized by a transformer 15 with each electrode being coupled respectively to one phase of the transformer secondary winding 16. The primary transformer winding 18 is coupled by conductors 19A, 19B and 19C to a source of three phase electrical energy.

Those skilled in the art will appreciate that any well known type of electrical positioning mechanism may be employed, such as for example, a cable and pulley or a hydraulic cylinder. It is sufficient for purposes of understanding the invention to state that the mechanism may also include a positioning device such as a motor 26A, 26B and 26C which are respectively coupled to the electrodes 12A, 12B and 12C for moving the same vertically. The motors 26A, 26B and 26C may be either electric or hydraulic and each is coupled to a well known electroresponsive control 28A, 28B and 28C, respectively, for selectively operating its associated motor to raise or lower the electrodes individually in accordance with the magnitude and sense of an applied electrical signal from a phase angle sensing circuit 30. It will be understood that other conventional electrode positioning means may also be employed.

The phase angle sensing circuit 30 includes three individual circuits 30A, 30B and 30C for respectively sensing the phase angle of the primary voltage and current in phase conductors 19A, 19B and 19C. The phase angle sensing circuits are all identical and accordingly only circuit 30A will be discussed in detail for the sake of brevity. In particular, the phase angle sensing circuit 30A includes a phase angle measuring device or circuit 32A which is operative to measure the phase angle between applied voltage and current signals. Phase angle sensing devices are well known in the art and will not be discussed in detail. For example, one such device is the Exeltronic Model 6330 phase angle transducer manufactured by Scientific Columbus. This device provides a voltage output signal which is functionally related to the zero crossing times of applied voltage and current signals and is in turn a measure of the phase angle therebetween.

The zero point of the voltage in conductor 19A is determined by a transformer 33A having a primary winding 34A connected to conductor 19A and a secondary winding 36A connected to the phase angle measuring circuit 32A. A voltage signal Va functionally related to the phase voltage is generated in the secondary transformer 36A and is applied to circuit 32A and to a power measuring biasing circuit 38 for purposes which will be disclosed hereinbelow.

The zero point of the current in phase conductor 19A is determined by a current transformer 40A coupled to conductor 19A and connected to the phase angle measuring circuit 32A. A current signal Ia functionally related to the current flowing in conductor 19A is also applied to circuit 32A and to the power measuring bias circuit 38. Similarly, current signals Ib and Ic functionally related to the current flowing in phase conductors 19B and 19C, respectively, are generated by current transformers 40B and 40C and are applied to the circuits 32B and 32C and to the power measuring bias circuit 38. Also voltage signals Vb and Vc functionally related to the voltage in phase conductors 19B and 19C are generated by transformers 33B and 33C and are applied to the circuits 32B and 32C and to the power measuring bias circuit 38.

The reactive volt ampere measuring bias circuit 38 is a conventional circuit which is constructed and arranged to provide an output voltage signal which is functionally related to the reactive volt ampere load of the primary conductors 19A, 19B and 19C.

Null detector circuits 42A, 42B and 42C are connected to receive the output voltage signals from the phase angle measuring circuits 32A, 32B and 32C, respectively, and in addition, each receives a bias signal from the reactive volt ampere measuring bias circuit 38. Amplifiers 44A, 44B and 44C are respectively connected between the null detector circuits 42A, 42B and 42C and the control circuits 28A, 28B and 28C.

In operation, each phase angle measuring circuit 32A, 32B and 32C will deliver to the null detector circuits 42A, 42B and 42C, respectively, voltage signals functionally related to the phase angle between the voltage and current in the primary phase conductors 19A, 19B and 19C to which each is coupled. In addition, the reactive volt ampere measuring bias circuit 38 will deliver to each null detector circuit a voltage signal functionally related to the reactive volt amperes in the primary conductors 19A, 19B and 19C. The null detector circuits 42A, 42B and 42C are each operative to deliver an output control signal whose magnitude and sense is a function of the difference between the input signals and a preset signal. In other words, the output control signals will be a function of the individual differences between the phase angles existing in each of the primary conductors 19A, 19B and 19C as modified by the bias signal.

The output signal from the null detector circuits 42A, 42B and 42C are each amplified by amplifiers 44A, 44B and 44C and the amplified signals delivered respectively to the control circuits 26A, 26B and 26C for individually controlling the position of the electrodes 12A, 12B and 12C.

Taking electrode 12A, for example, should the arc become shorter than the desired value, the phase angle between the voltage and current in primary conductor 19A will decrease from some preselected value. This will result in a decrease in the signal from the phase angle measuring circuit 32A causing a corresponding decrease in the output from the null circuit 42A. The control circuit 28A will respond to the decrease in its input signal for generating a control signal to the motor 26A which will result in the elevation of electrode 12A. As the electrode rises, the phase angle will also increase causing an increase in the output of the phase angle sensing circuit 32A. When this output signal reaches a preselective value, electrode 12A will be at the correct elevation as manifested by the desired phase angle whereupon the control circuit 28A will signal the motor 26A to maintain the electrode 12A in position.

Conversely, should the separation between electrode 12A and the furnace charge 11 become too large, the phase angle will increase beyond the desired amount. This will correspondingly increase the output from phase angle circuit 32A resulting in a higher output signal from null circuit 42A. As a result, control circuit 28A will generate signal to motor 26A for lowering the electrode 12A. This will then correspond to the maximum power achievable for a particular furnace. It will be understood that electrodes 12B and 12C will be controlled in a like manner.

While only a single embodiment of the invention has been illustrated and described, it was not intended to be limited thereby but only by the scope of the appended claims.

We claim:

1. A control for positioning the electrodes of a polyphase electric arc furnace energized by a poly-phase transformer having primary and secondary windings, and including control means for individually elevating and lowering each of the electrodes, the improvement comprising:

a plurality of first circuit means each coupled respectively to one of the primary phases of the transformer and each being operable respectively to generate a first electrical output signals functionally related to the phase angles between the voltage and current in each phase of the transformer primary, bias circuit means coupled to each of the phases of the transformer primary for producing an additional output signal functionally related to the reactive volt amperes delivered to the transformer primary, comparison means coupled to said first circuit means and said bias circuit means for respectively comparing the additional signal and each of said first signals to a preselected value and for producing a plurality of control signals related to differences in said signals, said control means coupled to said comparison means and being responsive to said control signals for selectively positioning each electrode whereby each electrode will be positioned in accordance with deviations in the phase angle in its respective primary circuit.

2. The control set forth in claim 1 wherein each of said plurality of first circuit means comprises a phase angle measuring circuit, coupled respectively to one phase of the primary of said transformer for sensing the zero point of the voltage and current in each phase.

3. The control set forth in claim 2 wherein said bias circuit means comprises a reactive volt ampere measuring circuit coupled to each of the primary phases for receiving an electric signal functionally related to the magnitude of the voltage and current therein for generating an output electrical signal functionally related to the reactive volt ampere consumption in said primary circuit.

4. The control set forth in claim 3 wherein said comparison means comprises a plurality of null detection means coupled respectively to receive one of said plurality of first electrical output signals and said additional output signal and each being operative for producing control signals functionally related to the difference between said output signals and a set point signal.

5. A method for individually controlling the position of electrodes in a polyphase electric arc furnace wherein said electrodes are energized by a polyphase transformer having primary and secondary windings wherein each secondary winding is connected to one of the electrodes for providing phase voltage and current thereto, separately measuring the phase angle between the voltage and current in each primary phase conductor connected to the transformer primary windings, generating angle electrical signals functionally related to the phase angle in each of the primary conductors, measuring the reactive load at the primary transformer windings and generating a bias electrical signal functionally related thereto, separately comparing each of said phase angle signals and the bias signal to a preset quantity and generating separate control signals based on each such comparison, and individually positioning each of the electrodes in relation to a charge in the arc furnace in relation to the magnitude and the sense of the respective control signals.

6. A control for individually positioning the electrodes of an electric arc furnace energized by a multi phase power source, and including control means for individually elevating and lowering each of the electrodes, the improvement comprising:

a plurality first circuit means coupled respectively to one of the phases of the power source and being operable respectively to generate separate electrical output signals functionally related to the phase angles between the voltage and current in each of said phases, bias circuit means coupled to each of the phases of the power source for producing an electrical bias signal functionally related to the reactive volt ampere loads of the electrodes, comparison means coupled to the first circuit means and the bias circuit means respectively comparing the bias signal and each of said output signals to a preselected value and for producing individual signals related to differences in said signals, said control means coupled to the comparison means and being responsive to said control signals for selectively positioning each electrode whereby each electrode will be positioned in accordance with deviations in the phase angles in its respective phase power supply.

7. A control for positioning the electrode of an electric arc furnace energized by a transformer having primary and secondary windings, and including control means for individually elevating and lowering the electrode, the improvement comprising:

first circuit means coupled to the primary of the transformer and being operable to generate a first electrical output signal functionally related to the phase angle between the voltage and current in the transformer primary, bias circuit means coupled to the transformer primary for producing a second output signal functionally related to the reactive volt amperes delivered to the transformer primary, comparison means coupled to said first circuit means and said bias circuit means for comparing the first and second signals to a preselected value and for producing a control signal related to differences between said signals and said preselected value, said control means coupled to said comparison means and being responsive to said control signals for selectively positioning each electrode whereby each electrode will be positioned in accordance with deviations in the phase angle in its respective primary circuit.

8. The control set forth in claim 7 wherein said first circuit means comprises a phase angle measuring circuit means coupled to transformer primary for sensing the zero point of the voltage and current therein.

9. The control set forth in claim 8 wherein said bias circuit comprises a reactive volt ampere measuring circuit coupled to the transformer primary for receiving an electric signal functionally related to the magnitude of the voltage and current therein for generating an output electrical signal functionally related to the power reactive volt ampere consumption in said primary circuit.

10. The control set forth in claim 9 wherein said comparison means comprises a null detection means coupled to receive the first and second output signals and being operative for producing a control signal functionally related to the difference between said output signals and a set point signal.

* * * * *